(12) United States Patent
Sanz Martinez et al.

(10) Patent No.: US 11,396,366 B2
(45) Date of Patent: Jul. 26, 2022

(54) ACTIVE LAMINAR FLOW CONTROL STRUCTURAL PLENUMS FASTENED

(71) Applicant: Rohr, Inc, Chula Vista, CA (US)

(72) Inventors: Pablo T. Sanz Martinez, San Diego, CA (US); Johann Steven Schrell, San Diego, CA (US); Thomas Paolini, Felton, CA (US)

(73) Assignee: Rohr, Inc., Chula Vista, CA (US)

( * ) Notice: Subject to any disclaimer, the term of this patent is extended or adjusted under 35 U.S.C. 154(b) by 965 days.

(21) Appl. No.: 16/147,064

(22) Filed: Sep. 28, 2018

(65) Prior Publication Data

US 2020/0102082 A1 Apr. 2, 2020

(51) Int. Cl.
| | |
|---|---|
| *B64C 21/06* | (2006.01) |
| *B64D 33/02* | (2006.01) |
| *B64C 1/12* | (2006.01) |
| *B64D 29/00* | (2006.01) |
| *B64C 1/00* | (2006.01) |

(52) U.S. Cl.
CPC ............... *B64C 21/06* (2013.01); *B64C 1/12* (2013.01); *B64D 29/00* (2013.01); *B64D 33/02* (2013.01); *B64C 2001/0072* (2013.01); *B64C 2230/22* (2013.01); *B64D 2033/0226* (2013.01)

(58) Field of Classification Search
CPC .... B64D 2033/0206; B64D 2033/0226; B64D 2033/0266; B64C 21/02; B64C 21/06
See application file for complete search history.

(56) References Cited

U.S. PATENT DOCUMENTS

| | | | |
|---|---|---|---|
| 2,742,247 A | * | 4/1956 | Lachmann .............. B64C 21/06 244/119 |
| 3,194,518 A | | 7/1965 | Walsh |
| 4,858,721 A | | 8/1989 | Autie et al. |
| 5,316,032 A | * | 5/1994 | DeCoux .................. B64C 21/06 137/829 |

(Continued)

FOREIGN PATENT DOCUMENTS

| | | |
|---|---|---|
| DE | 936618 | 12/1955 |
| EP | 0585561 | 3/1994 |

(Continued)

OTHER PUBLICATIONS

European Patent Office, European Office Action dated Oct. 27, 2021 in Application No. 19195429.6.

(Continued)

*Primary Examiner* — Nicholas McFall
(74) *Attorney, Agent, or Firm* — Snell & Wilmer L.L.P.

(57) ABSTRACT

An active laminar flow control arrangement may comprise a modular arrangement comprising a plurality of frames and cover panels coupled to an outer skin having a plurality of hat stiffeners and stringers. A first cover panel may be coupled between a first frame and a first hat stiffener. A second cover panel may be coupled between a second frame and a second hat stiffener. A third cover panel may be coupled between the first cover panel and the second cover panel. The cover panels may enclose associated plenums whereby a flow of air is pumped into the arrangement for maintaining a laminar flow across an aerodynamic surface of the outer skin.

16 Claims, 12 Drawing Sheets

(56) References Cited

U.S. PATENT DOCUMENTS

| | | | |
|---|---|---|---|
| 5,366,177 A * | 11/1994 | DeCoux | B64C 21/06 244/209 |
| 5,368,258 A | 11/1994 | Johnson et al. | |
| 8,783,624 B2 | 7/2014 | Koppelman et al. | |
| 9,663,238 B2 | 5/2017 | Kane et al. | |
| 2008/0111024 A1 | 5/2008 | Lee et al. | |
| 2010/0276548 A1 | 11/2010 | Porte et al. | |
| 2011/0005188 A1 | 1/2011 | Roger | |
| 2016/0263878 A1 | 9/2016 | Weaver et al. | |
| 2016/0311520 A1 | 10/2016 | Khidekel | |
| 2017/0096230 A1 | 4/2017 | Surply et al. | |
| 2019/0202566 A1 * | 7/2019 | Heck | B64C 5/02 |

FOREIGN PATENT DOCUMENTS

| | | |
|---|---|---|
| EP | 1232944 | 8/2002 |
| EP | 3093236 | 11/2016 |
| EP | 3159259 | 4/2017 |
| EP | 3205491 | 8/2017 |
| GB | 2252076 | 7/1992 |
| WO | 9221560 | 12/1992 |

OTHER PUBLICATIONS

European Patent Office, European Office Action dated Oct. 27, 2021 in Application No. 19195211.8.

European Patent Office, European Office Action dated Apr. 13, 2021 in Application No. 19191006.6.

European Patent Office, European Search Report dated Feb. 4, 2020 in Application No. 19195429.6.

European Patent Office, European Search Report dated Feb. 26, 2020 in Application No. 19191006.6.

European Patent Office, European Search Report dated Jan. 27, 2020 in Application No. 19195211.8.

Pablo T. Sanz Martinez et al, U.S. Appl. No. 16/147,125, filed Sep. 28, 2018 and entitled "Active Laminar Flow Control Plenum Panel Arrangement".

Pablo T. Sanz Martinez et al, U.S. Appl. No. 16/147,145, filed Sep. 28, 2018 and entitled "Active Laminar Flow Control Plenum Panel Arrangements and Installation Methods".

USPTO, Pre-Interview First Office Action dated Mar. 9, 2022 in U.S. Appl. No. 16/147,125.

* cited by examiner

ACTIVE LAMINAR FLOW CONTROL STRUCTURAL PLENUMS FASTENED

FIELD

The present disclosure relates to laminar flow control for engine aircraft engine nacelles, and more particularly to systems and methods for plenum structures for laminar flow control systems.

BACKGROUND

A nacelle is the housing for a turbofan gas turbine engine used to power, for example, a commercial airliner. The nacelle and the engine together are referred to as the propulsion system or power plant of the aircraft. The nacelle forms the external aerodynamic surfaces of the propulsion system, and also helps form the duct for the bypass air from the fan, as well as encloses all the components and auxiliary devices surrounding and attached to the engine. The nacelle may also optionally provide a reverse thrust means to generate reverse thrust to slow the aircraft, for example during landing.

SUMMARY

An active laminar flow control arrangement is disclosed, comprising an outer skin having a first hat stiffener and a second hat stiffener spaced apart along an inner surface of the outer skin and a first stringer and a second stringer spaced apart along the inner surface of the outer skin, the first stringer and the second stringer are oriented substantially orthogonal with respect to the first hat stiffener and the second hat stiffener, a first frame coupled to the inner surface and disposed between the first hat stiffener and the second hat stiffener, a second frame coupled to the inner surface and disposed between the first hat stiffener and the second hat stiffener, the first frame and the second frame oriented substantially parallel with respect to the first hat stiffener and the second hat stiffener, a first cover panel coupled between the first frame and the first hat stiffener, a second cover panel coupled between the second frame and the second hat stiffener, and a third cover panel coupled between the first cover panel and the second cover panel.

In various embodiments, the active laminar flow control arrangement further comprises a first plenum at least partially defined by the first hat stiffener and the first frame, a second plenum at least partially defined by the first frame and the second frame, and a third plenum at least partially defined by the second frame and the second hat stiffener.

In various embodiments, the active laminar flow control arrangement further comprises a perforated area disposed in the outer skin.

In various embodiments, at least one of the first cover panel, the second cover panel, and the third cover panel extend from the first stringer to the second stringer.

In various embodiments, the first cover panel is coupled to the first frame via a first fastener.

In various embodiments, the first cover panel is coupled to the first hat stiffener via a second fastener.

In various embodiments, the third cover panel is coupled to the first cover panel via a third fastener.

In various embodiments, the first frame is coupled to the outer skin via a fourth fastener, the fourth fastener is flush with an outer surface of the outer skin.

In various embodiments, the active laminar flow control arrangement further comprises a pump in fluid communication with the outer skin.

In various embodiments, at least one of the first cover panel and the second cover panel comprises a longitudinal wall and a radial wall extending from the longitudinal wall.

In various embodiments, the third cover panel overlaps the first cover panel and the second cover panel.

A nacelle inlet is disclosed, comprising an outer skin having a first hat stiffener and a second hat stiffener spaced apart along an inner surface of the outer skin and a first stringer and a second stringer spaced apart along the inner surface of the outer skin, the first stringer and the second stringer are oriented substantially orthogonal with respect to the first hat stiffener and the second hat stiffener, a first frame coupled to the inner surface and disposed between the first hat stiffener and the second hat stiffener, a second frame coupled to the inner surface and disposed between the first hat stiffener and the second hat stiffener, the first frame and the second frame oriented substantially parallel with respect to the first hat stiffener and the second hat stiffener, a first cover panel coupled between the first frame and the first hat stiffener, a second cover panel coupled between the second frame and the second hat stiffener, and a third cover panel coupled between the first cover panel and the second cover panel.

In various embodiments, the nacelle inlet further comprises a perforated area disposed in the outer skin, a first plenum at least partially defined by the first hat stiffener and the first frame, a second plenum at least partially defined by the first frame and the second frame, and a third plenum at least partially defined by the second frame and the second hat stiffener, wherein at least one of the first plenum, the second plenum, and the third plenum is configured to receive a flow of ambient air from an outer surface of the outer skin via the perforated area for maintaining a laminar flow of air over the outer skin.

In various embodiments, at least one of the first cover panel, the second cover panel, and the third cover panel extend from the first stringer to the second stringer.

In various embodiments, the nacelle inlet further comprises a pump in fluid communication with the perforated area and configured to maintain the flow of ambient air.

In various embodiments, the first cover panel, the second cover panel, and the third cover panel are made from a carbon fiber composite material.

In various embodiments, the first plenum, the second plenum, and the third plenum are at least partially defined by the first stringer and the second stringer.

A method of installing a laminar flow control arrangement onto a nacelle inlet is disclosed, comprising coupling a first frame to an inner surface of an outer skin of the nacelle inlet between a first stiffener and a second stiffener, coupling a second frame to the inner surface between the first stiffener and the second stiffener, coupling a first cover panel between the first stiffener and the first frame to enclose a first plenum, coupling a second cover panel between the second stiffener and the second frame to enclose a second plenum, and coupling a third cover panel between the first cover panel and the second cover panel to enclose a third plenum.

In various embodiments, the method further comprises disposing the third cover panel radially inward from the first cover panel and the second cover panel, wherein the third cover panel overlaps the first cover panel and the second cover panel.

In various embodiments, the method further comprises coupling the first cover panel to a first stringer and a second stringer, coupling the second cover panel to the first stringer and the second stringer, and coupling the third cover panel to the first stringer and the second stringer.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading and/or crosshatching lines may be used throughout the figures to denote different parts, but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

A laminar flow control duct arrangement, as disclosed herein, may be a modular arrangement having readily replaceable panels and frames. In various embodiments, the laminar flow control duct arrangement is particularly useful for modular installation onto nacelle inlet outer skins having integrally formed stiffeners (e.g., hat stiffeners and/or stringers). Furthermore, the laminar flow control duct arrangement may be adjustable to form various sized plenums as desired and to accommodate various inlet designs.

Xyz-axes are provided in certain figures described herein for ease of illustration.

Figure 1A:
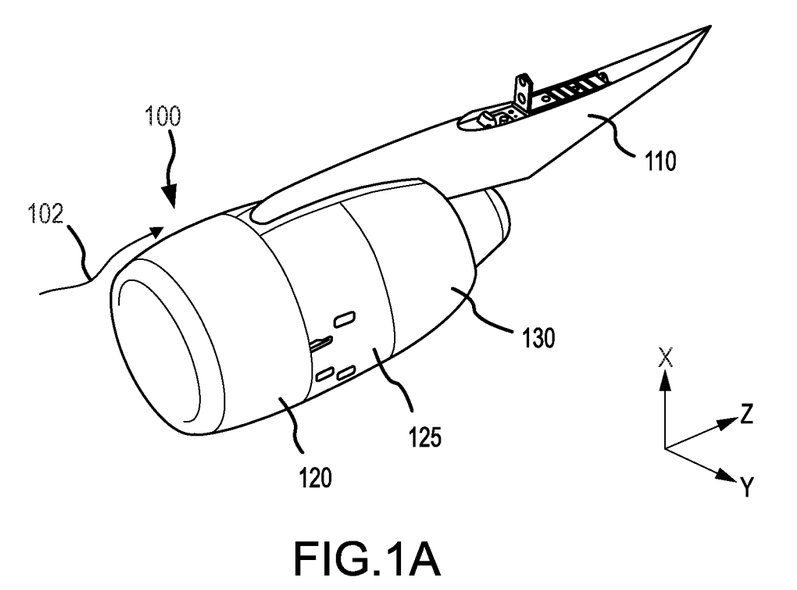
FIG. 1A illustrates a perspective view of a propulsion system and its elements, in accordance with various embodiments.
Figure 1B:
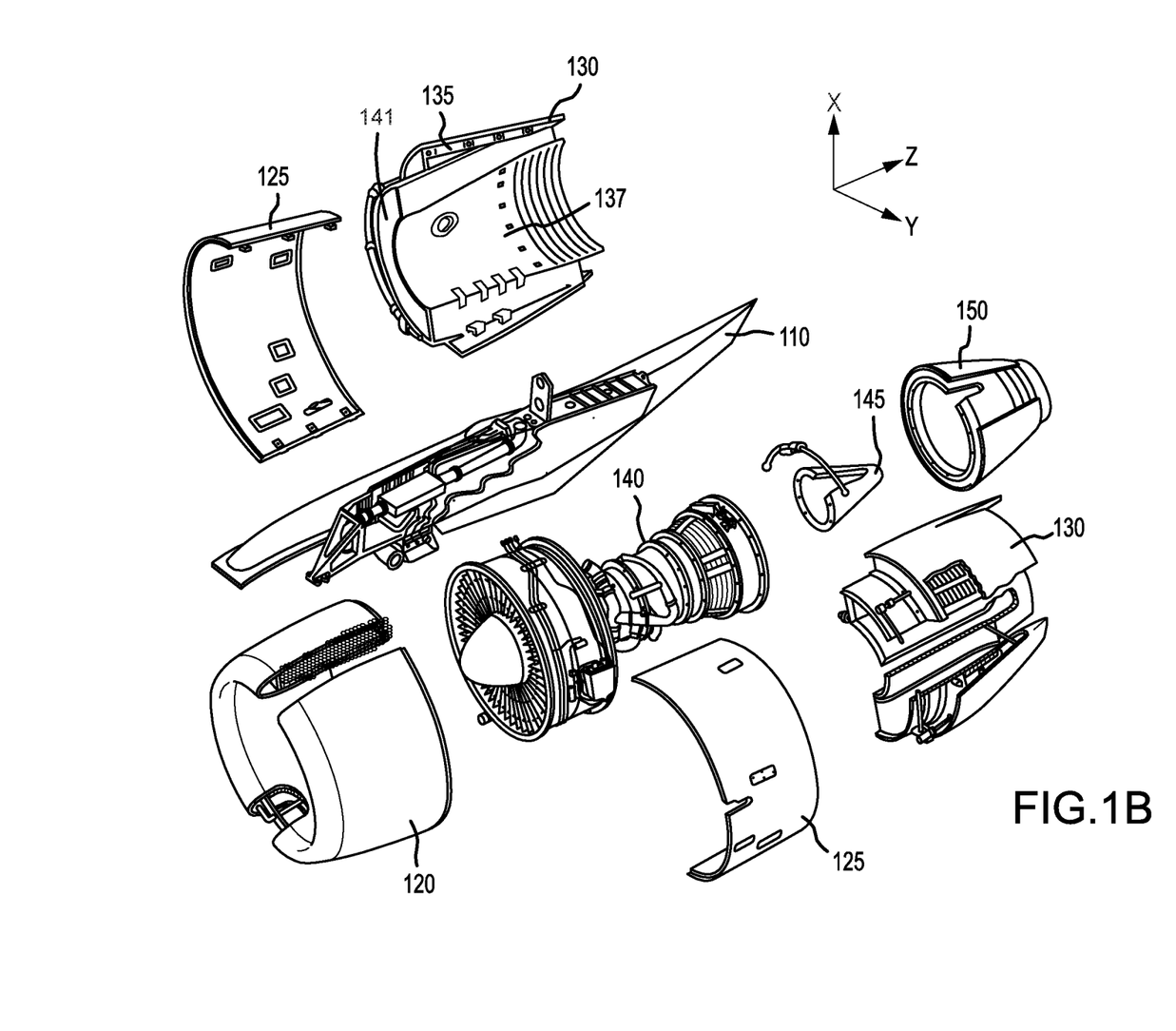
FIG. 1B illustrates an exploded view of the propulsion system and its elements of FIG. 1A, in accordance with various embodiments.

With reference to FIGS. 1A and 1B, a turbofan propulsion system for a commercial jetliner may include an engine 140, a pylon 110, and a nacelle package (also referred to herein as a nacelle) 100. The typical nacelle package, or more simply a nacelle, may comprise an inlet 120, a fan cowl 125, a thrust reverser 130, and an exhaust system including an exhaust cone 145, and exhaust nozzle 150. The nacelle 100 surrounds the engine providing smooth aerodynamic surfaces for airflow around and into the engine. The nacelle also helps define a bypass air duct through the propulsion system.

A fan draws and directs a flow of air into and through the propulsion system. After the fan, the air is divided into two principal flowpaths, one flowpath through the engine core, and another flowpath through a bypass air duct. The engine core flowpath is directed into the engine core and initially passes through a compressor that increases the air flow pressure, and then through a combustor where the air is mixed with fuel and ignited. The combustion of the fuel and air mixture causes a series of turbine blades at the rear of the engine core to rotate, and to drive the engine's rotor and fan. The high-pressure exhaust gases from the combustion of the fuel and air mixture are thereafter directed through an exhaust nozzle at the rear of the engine for thrust.

The bypass air flowpath includes air that is directed around the engine core in a duct or ducts defined by the nacelle. The bypass air exits the duct at a nozzle at the aft end of the nacelle for thrust. In turbofan engines, the bypass flow typically provides a large percentage of the thrust for an aircraft. The bypass air ducts in the nacelle may be C-shaped, and may be principally defined by the exterior surface of the inner fixed structure (IFS) 137 and the inside surface of the outer sleeve 141. If the nacelle includes a typical thrust reverser, the thrust reverser blocks bypass air in the bypass air duct from reaching the nozzle, and instead redirects the bypass air to exit the duct in a forward direction of the aircraft to generate reverse thrust.

The engine 140 may be mounted to pylon 110 in two places. One of these at the aft end of the pylon 110, over the engine turbine case, and in one of two places at the forward end of pylon 110: the engine core (core mount) or the engine fan case (fan mount). Pylon 110 transmits structural loads (including thrust) between engine 140 and a wing.

The thrust reverser 130 may comprise two halves generally configured to surround the engine core. The thrust reverser 130 may be hinged to the pylon 110 via one or more hinges. The thrust reverser 130 comprises an IFS 137 and an outer sleeve 141. The IFS generally surrounds the engine core. As used herein, the outer sleeve 141, though it may have any shape, may generally be a C shaped structure. An exterior surface of the outer sleeve is external to the nacelle. An interior surface of the outer sleeve 141, along with the IFS 137, partially defines a cold flow path of the propulsion system of the aircraft. The IFS 137 and the outer sleeve 141 are typically coupled together and attached to the pylon 110 via a hinge beam 135. As used herein, the IFS 137 is generally referred to as an IFS; however it should be appreciated that a first IFS half may be configured to partially surround an engine core and a second IFS half may be configured to substantially partially surround the remaining engine core.

In operation, an ambient air flow 102 on the exterior of the nacelle 100 generates drag. The drag force tends to increase fuel consumption.

If the flow around the nacelle 100 is laminar the drag force will be reduced compared to a turbulent flow. Aircraft and nacelle designers have utilized nacelle external aerodynamic shapes that maintain a natural laminar flow over a portion of the nacelle 100. By carefully selecting the aerodynamic profile, natural laminar flow can be achieved. The portion where it is desired to achieve laminar flow should be clean of debris and aerodynamically smooth (e.g., fastener heads should be flush and parallel with the surrounding surface). Steps and gaps can cause the laminar flow to trip and transition to turbulent flow. Other active or hybrid natural/active techniques have been proposed for achieving and maintaining laminar flow on an aircraft nacelle and other aircraft surfaces. One such technique is through boundary layer ingestion or suction where the boundary layer next to the aircraft surface is pulled through small holes in the surface to remove the low energy boundary layer and regenerate it or maintain it at a minimum or near minimum energy level. Active or hybrid laminar flow techniques may achieve and maintain laminar flow more consistently than natural means alone, and may be able to extend further aft the region of nacelle 100 which has laminar flow.

Figure 2:
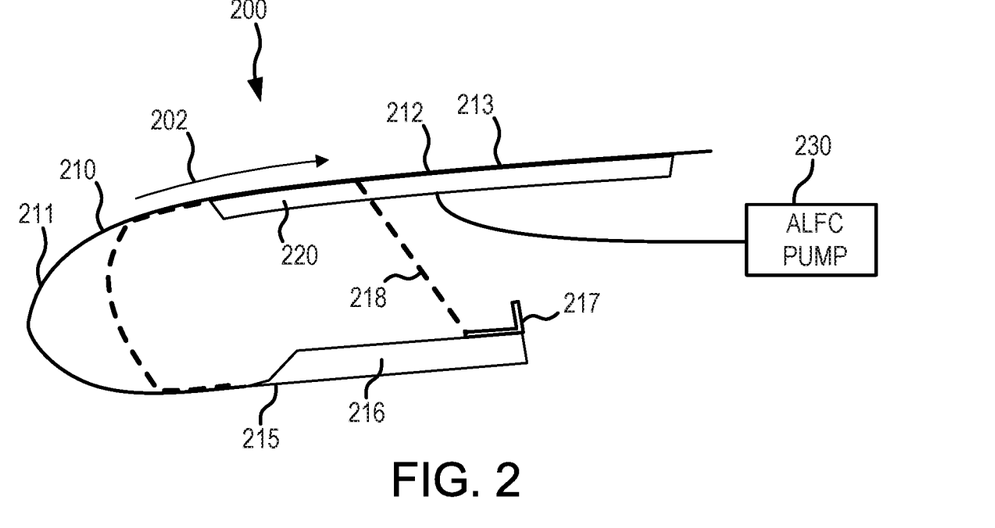
FIG. 2 illustrates a schematic section view of a nacelle inlet having an active laminar flow control arrangement, in accordance with various embodiments.

With reference to FIG. 2, a schematic view of an active laminar flow control arrangement 200 is illustrated, in accordance with various embodiments. In various embodiments, active laminar flow control arrangement 200 includes a nacelle inlet 210. Nacelle inlet 210 may be similar to nacelle inlet 120 of FIG. 1. A laminar flow control duct arrangement 220 may be coupled to nacelle inlet 210. Laminar flow control duct arrangement 220 may be in fluid communication with a plurality of orifices (i.e., perforations) 213 disposed in the outer skin 212 of nacelle inlet 210. In various embodiments, outer skin 212 defines an outer aerodynamic surface of nacelle inlet 210. Laminar flow control duct arrangement 220 may be in fluid communication with a pump 230 whereby an ambient airflow 202 is drawn into laminar flow control duct arrangement 220 from outside of nacelle inlet 210 through orifices 213. Pump 230 may be a fluid (e.g., air) pump. Pump 230 may be mounted to a fan case. It is appreciated that the location of pump 230 is not particularly limited. In this manner, a laminar or near laminar flow may be maintained over nacelle inlet 210, thereby increasing the aerodynamic performance of the nacelle inlet 210. It is appreciated that the present disclosure may be useful for an active laminar flow control system for any desirable aerodynamic surface of an aircraft or any suitable portion of a nacelle, such as the fan cowl for example.

In various embodiments, nacelle inlet 210 comprises an inner barrel 215. Nacelle inlet 210 may comprise a nose lip 211. Inner barrel 215 may be coupled to outer skin 212 via nose lip 211. In various embodiments, inner barrel 215 may be acoustically treated. In various embodiments, nacelle inlet 210 includes an acoustic liner 216 coupled to inner barrel 215. Nacelle inlet 210 may include an attachment ring 217. Nacelle inlet 210 may be configured to be coupled to an adjacent fan case via attachment ring 217. Nacelle inlet 210 may include an aft bulkhead 218 extending between attachment ring 217 and outer skin 212.

Figure 3A:
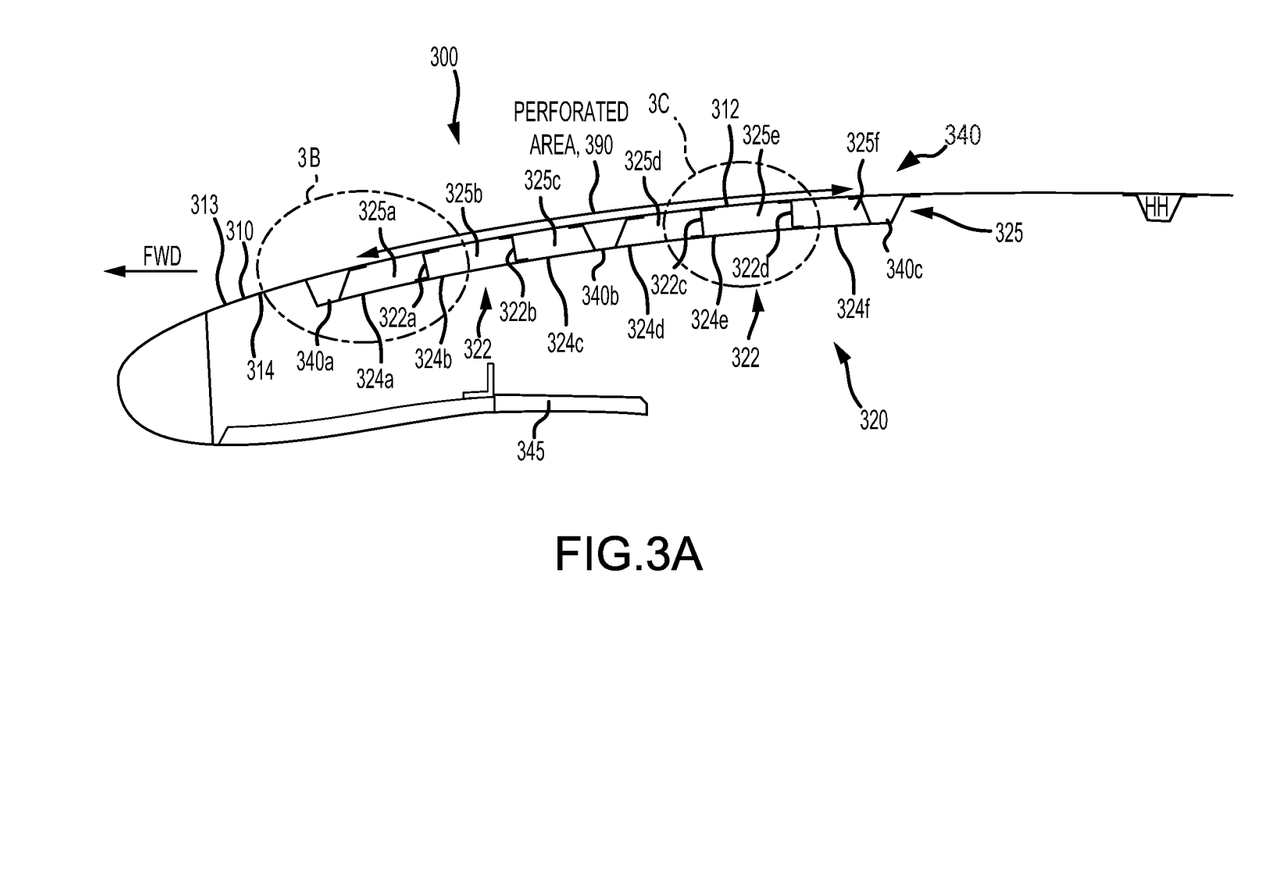
FIG. 3A, FIG. 3B, and FIG. 3C illustrate a section view of a nacelle inlet having an active laminar flow control arrangement, in accordance with various embodiments.
Figure 3B:
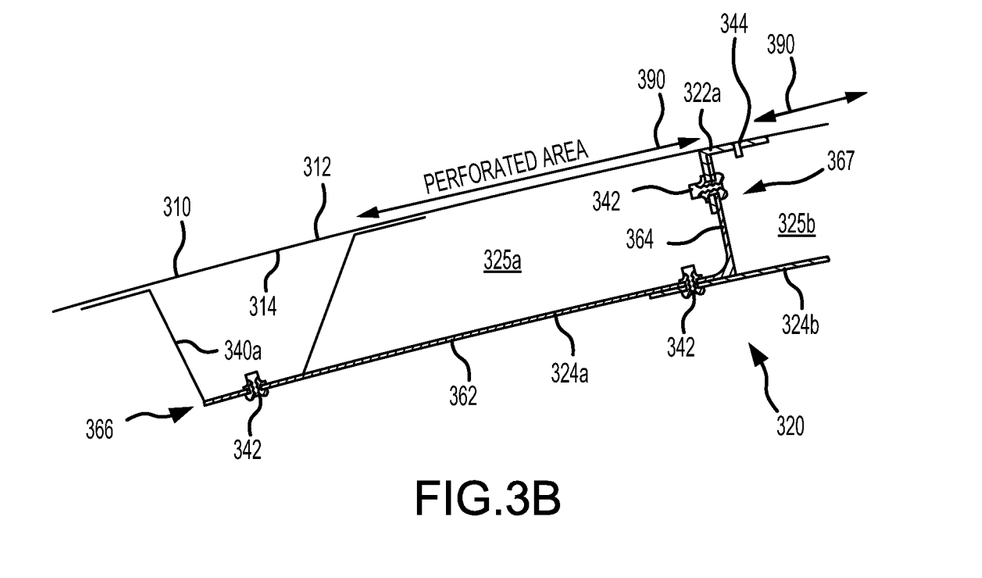
Figure 3C:
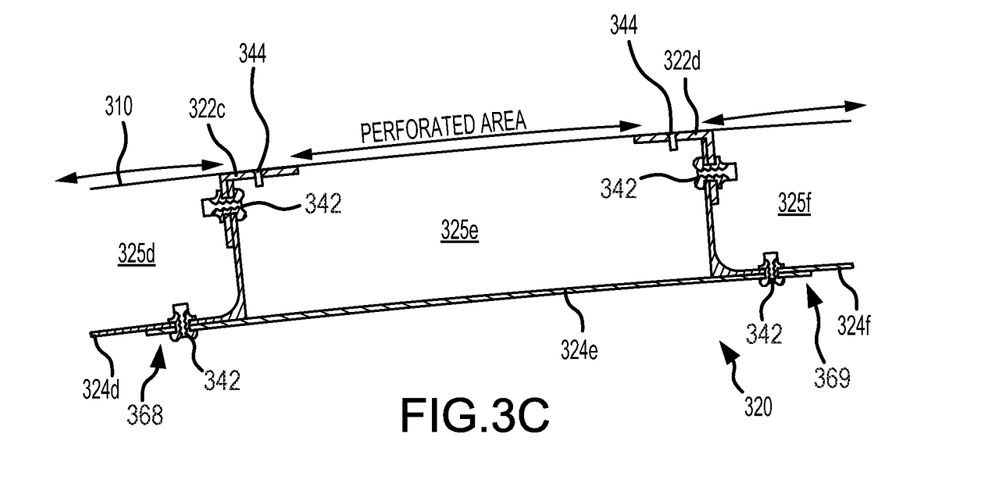

With combined reference to FIG. 3A, FIG. 3B, and FIG. 3C, a section view of an active laminar flow control arrangement 300 is illustrated, in accordance with various embodiments. In various embodiments, active laminar flow control arrangement 300 includes a nacelle inlet 310. Nacelle inlet 310 may be similar to nacelle inlet 210 of FIG. 2. Nacelle inlet 310 may be coupled to a fan case 345. A laminar flow control duct arrangement 320 may be coupled to nacelle inlet 310. An outer skin 312 of nacelle inlet 310 may comprise a perforated area 390. Laminar flow control duct arrangement 320 may receive a flow of air through the perforated area 390 of outer skin 312. Outer skin 312 may comprise an outer surface 313 and an inner surface 314. Perforated area 390 may comprise a plurality of perforations placing outer surface 313 in fluid communication with inner surface 314.

In various embodiments, nacelle inlet 310 may comprise a plurality of stiffeners (also referred to herein as hat stiffeners) 340 (e.g., hat stiffener 340a, hat stiffener 340b, and hat stiffener 340c) extending inward from an inner surface (also referred to herein as a proximal surface) 314 of outer skin 312. In various embodiments, hat stiffeners 340 are hollow hat stiffeners. Hat stiffeners 340 may extend circumferentially around outer skin 312. Hat stiffeners 340 may provide structural support to outer skin 312. Hat stiffeners 340 may provide torsion rigidity, bending stiffness, and buckling resistance to nacelle inlet 310. Hat stiffeners 340 may comprise a hat shaped cross-section.

In various embodiments, hat stiffeners 340 may be cured to outer skin 312, for example during a carbon fiber composite layup process. In various embodiments, hat stiffeners 340 may be bonded to outer skin 312. In various embodiments, hat stiffeners 340 may be welded to outer skin 312, for example where hat stiffeners 340 and outer skin 312 are a metal or metal alloy, such as aluminum for example. It is appreciated that the method of attachment of hat stiffeners 340 to outer skin 312 is not particularly limited.

In various embodiments, laminar flow control duct arrangement 320 may comprise a plurality of frames 322 (e.g., frame 322a, frame 322b, frame 322c, frame 322d, frame 322e, and frame 322ƒ). In various embodiments, frames 322 may comprise long, narrow structural supports for coupling the cover panels to the outer skin 312. In various embodiments, frames 322 may comprise a right angle cross-sectional geometry. In various embodiments, frames 322 may be made of a composite material such as carbon fiber and/or glass fiber. Frames 322 may extend circumferentially about outer skin 312. Frames 322 may extend inward from outer skin 312. Stated differently, frames 322 may be coupled to inner surface 314. Frames 322 may extend circumferentially substantially parallel with hat stiffeners 340.

In various embodiments, a plurality of cover panels 324 (e.g., cover panel 324a, cover panel 324b, cover panel 324c, cover panel 324d, cover panel 324e, and cover panel 324ƒ are coupled between frames 322 and/or hat stiffeners 340, thereby enclosing plenums 325 (e.g., plenum 325a, plenum 325b, plenum 325c, plenum 325d, plenum 325e, and plenum 325f). In this manner, laminar flow control duct arrangement 320 may comprise a module arrangement defining a plurality of plenums 325 for receiving a flow of air from outside of nacelle inlet 310 via the perforated area 390.

With particular focus on FIG. 3B, cover panel 324a may be coupled between a first hat stiffener 340a and frame 322a. Cover panel 324a may enclose plenum 325a. Cover panel 324a may comprise a longitudinal wall 362 and a radial wall 364 extending outward from longitudinal wall 362. Radial wall 364 may be oriented substantially perpendicular to longitudinal wall 362. Cover panel 324a may be supported between first hat stiffener 340a and frame 322a. A first side 366 of cover panel 324a may be coupled to first hat stiffener 340a. A second side 367 of cover panel 324a may be coupled to frame 322a.

In various embodiments, cover panel 324a may be coupled to first hat stiffener 340a via a fastener 342. Cover panel 324a may be coupled to frame 322a via a fastener 342. In various embodiments, fastener 342 may be a blind fastener for composite materials such as the Composi-Lok® fastener, sold by Monogram Aerospace Fasteners.

In various embodiments, frame 322a may be coupled to nacelle inlet 310 via a fastener 344, such as a rivet for example. Fastener 344 may be flush with outer skin 312.

With particular focus on FIG. 3C, cover panel 324d associated with plenum 325d may be coupled between a hat stiffener 340 (similar to cover panel 324a described above with respect to FIG. 3B) and frame 322c. Furthermore, cover panel 324f associated with plenum 325f may be coupled between a hat stiffener 340 (similar to cover panel 324a described above with respect to FIG. 3B) and frame 322d. Cover panel 324e may be coupled over cover panel 324d and cover panel 324f, enclosing plenum 325e. Cover panel 324b may be supported on either end by cover panel 324d and cover panel 324f. A first side 368 of cover panel 324e may be coupled cover panel 324d. A second side 369 of cover panel 324e may be coupled to cover panel 324f. In this manner, laminar flow control duct arrangement 320 may be a modular arrangement having readily replaceable panels and frames. In various embodiments, laminar flow control duct arrangement 320 is particularly useful for modular installation onto nacelle inlet outer skins having integrally formed stiffeners (e.g., hat stiffeners and/or stringers). Furthermore, laminar flow control duct arrangement 320 is adjustable to form various sized plenums as desired and accommodate various inlet designs.

Figure 4:
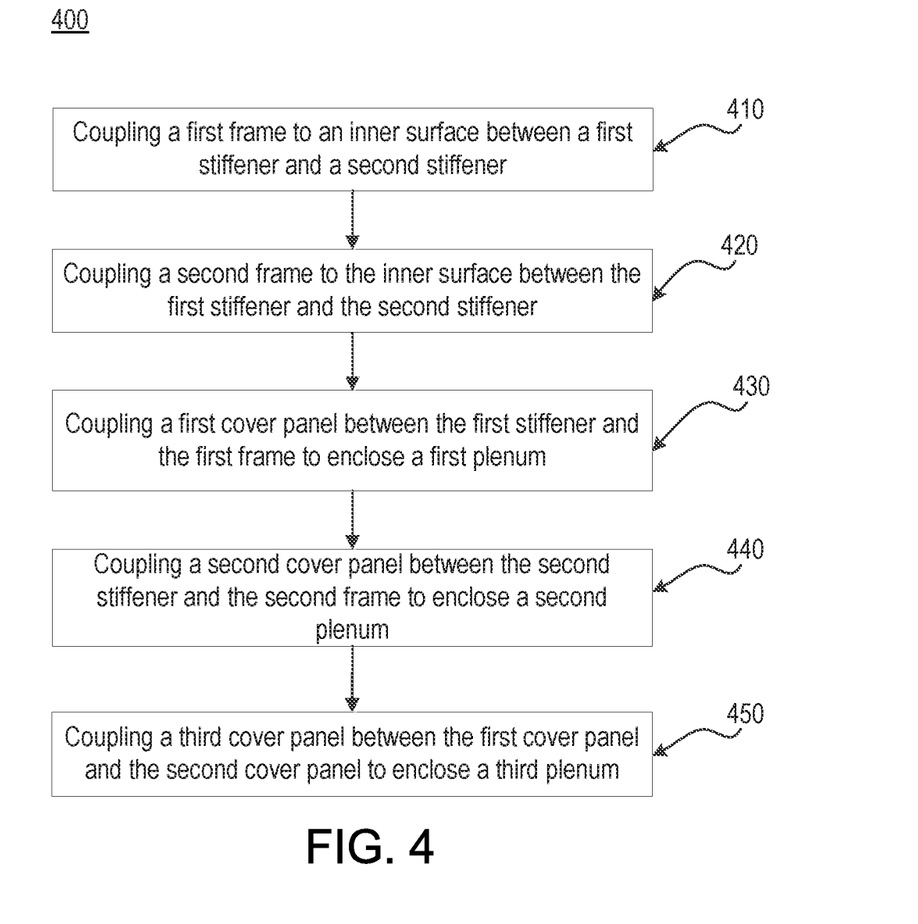
FIG. 4 illustrates a flow chart for a method for installing a laminar flow control arrangement onto a nacelle inlet, in accordance with various embodiments.

With reference to FIG. 4, a flow chart for a method 400 for installing a laminar flow control duct arrangement is illustrated, in accordance with various embodiments. Method 400 includes coupling a first frame to an inner surface between a first stiffener and a second stiffener (step 410). Method 400 includes coupling a second frame to the inner surface between the first stiffener and the second stiffener (step 420). Method 400 includes coupling a first cover panel between the first stiffener and the first frame to enclose a first plenum (step 430). Method 400 includes coupling a second cover panel between the second stiffener and the second frame to enclose a second plenum (step 440). Method 400 includes coupling a third cover panel between the first cover panel and the second cover panel to enclose a third plenum (step 450).

With combined reference to FIG. 3A and FIG. 4, step 410 may include coupling frame 322a to inner surface 314 between first hat stiffener 340a and second hat stiffener 340b. Step 420 may include coupling frame 322b to inner surface 314 between hat stiffener 340a and hat stiffener 340b. Step 430 may include coupling cover panel 324a between hat stiffener 340a and frame 322a to enclose plenum 325a. Step 440 may include coupling cover panel 324c between hat stiffener 340b and frame 322b, thereby enclosing plenum 325c. Step 450 may include coupling a cover panel 324b between cover panel 324a and cover panel 324c, thereby enclosing plenum 325b. In various embodiments, cover panel 324b may overlap cover panel 324a and cover panel 324c in the installed position. Stated differently, cover panel 324b may be disposed inward from cover panel 324a and cover panel 324c.

Figure 5A:
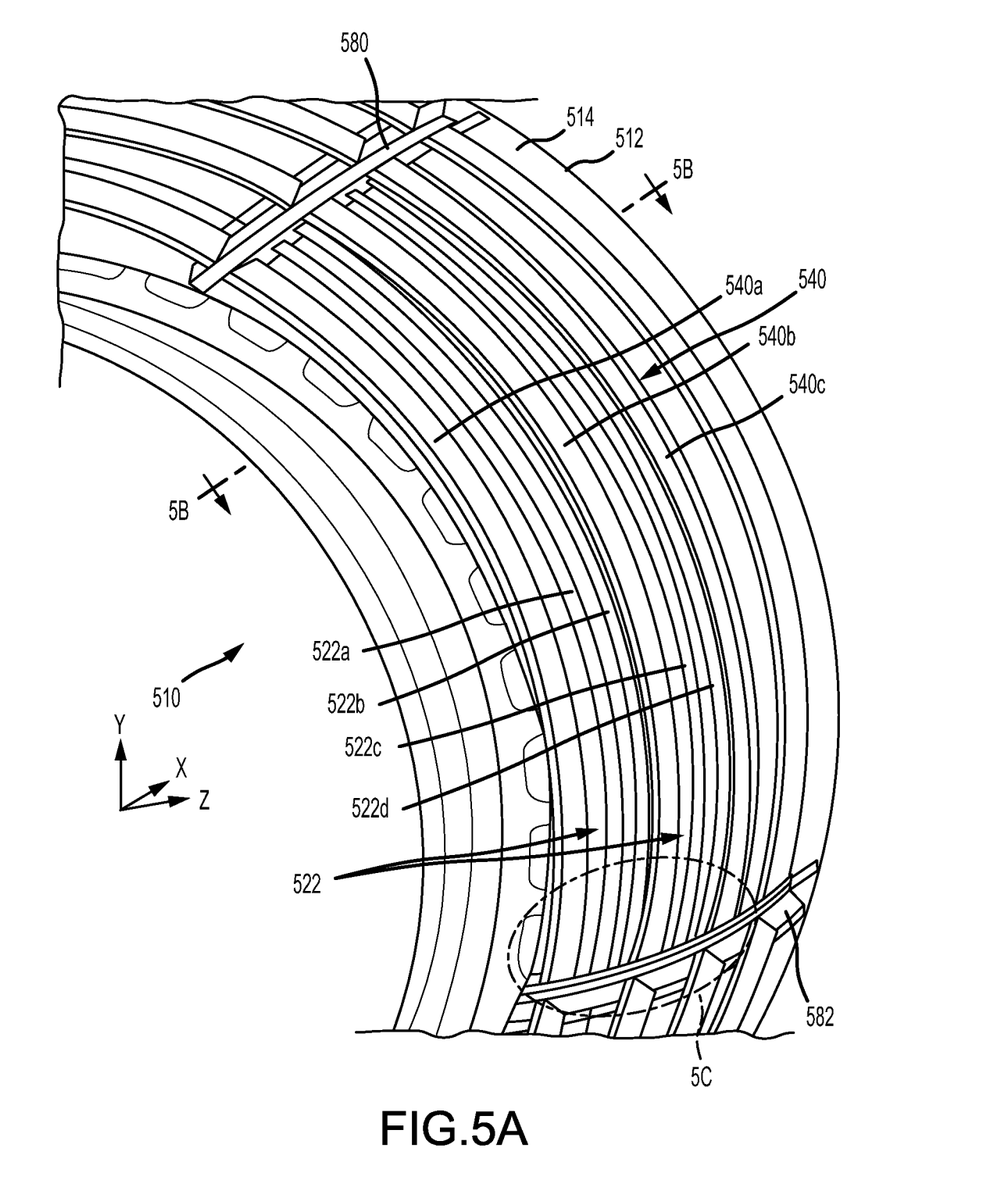
FIG. 5A, FIG. 5B, and FIG. 5C illustrate perspective views of a nacelle inlet having a plurality of frames installed thereon, in accordance with various embodiments.
Figure 5B:
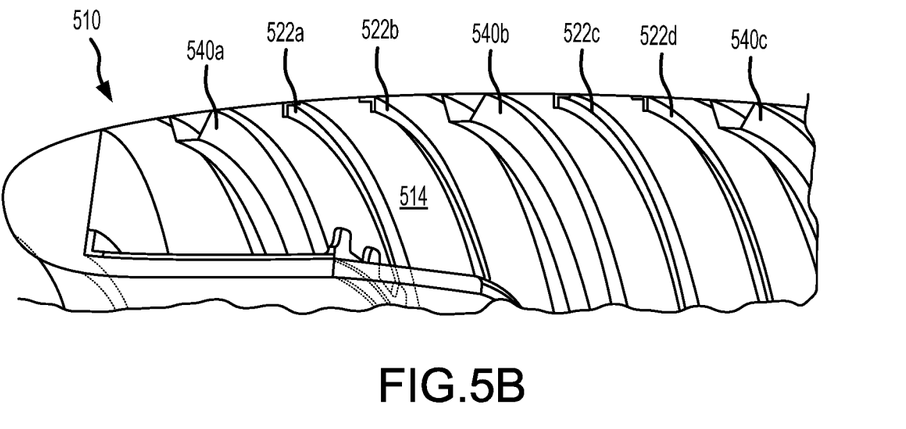
Figure 5C:
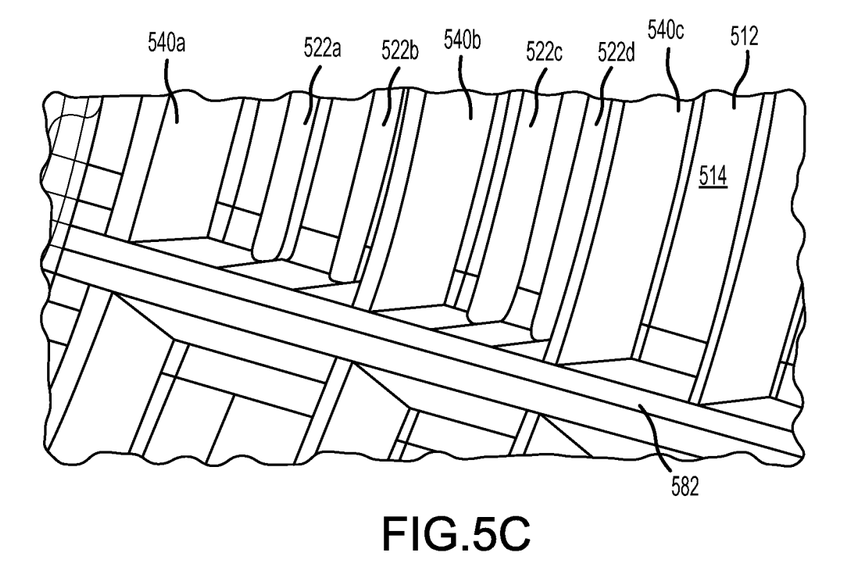

With reference to FIG. 5A, FIG. 5B, and FIG. 5C, a nacelle inlet 510 with a plurality of frames 522 (i.e., frame 522a, frame 522b, frame 522c, and frame 522d) in the installed position is illustrated, in accordance with various embodiments. In various embodiments, nacelle inlet 510 is similar to nacelle inlet 310 of FIG. 3A. Frames 522 may be equally spaced between hat stiffener 540a and hat stiffener 540b. The spacing between frames 522 may be varied between hat stiffener 540a and hat stiffener 540b depending on the desired longitudinal dimension of the associated plenums. With momentary reference to FIG. 4, step 410 and step 420 may include coupling frame 522a and frame 522b, respectively, to inner surface 514 between hat stiffener 540a and hat stiffener 540b.

In various embodiments, a stringer (also referred to herein as a first stringer) 580 and a stringer (also referred to herein as a second stringer) 582 may extend longitudinally along inner surface 514 of nacelle inlet 510. Stringer 580 and stringer 582 may be circumferentially spaced apart from each other. Hat stiffeners 540 may extend between stringer 580 and stringer 582. Hat stiffeners 540 may extend substantially perpendicular to stringer 580 and stringer 582. Stringer 580 and stringer 582 may be in the form of longitudinally extending, hat shaped structural members. Hat stiffeners 540, stringer 580, and stringer 582 may, in combination, increase the rigidity of outer skin 512.

In various embodiments, frames 522 may extend circumferentially between stringer 580 and stringer 582. The ends of frames 522 may contact stringer 580 and stringer 582 to divide separate plenums disposed longitudinally (Z-direction) between each frame. Stated differently, frames 522 may extend circumferentially from stringer 580 and stringer 582.

Figure 6A:
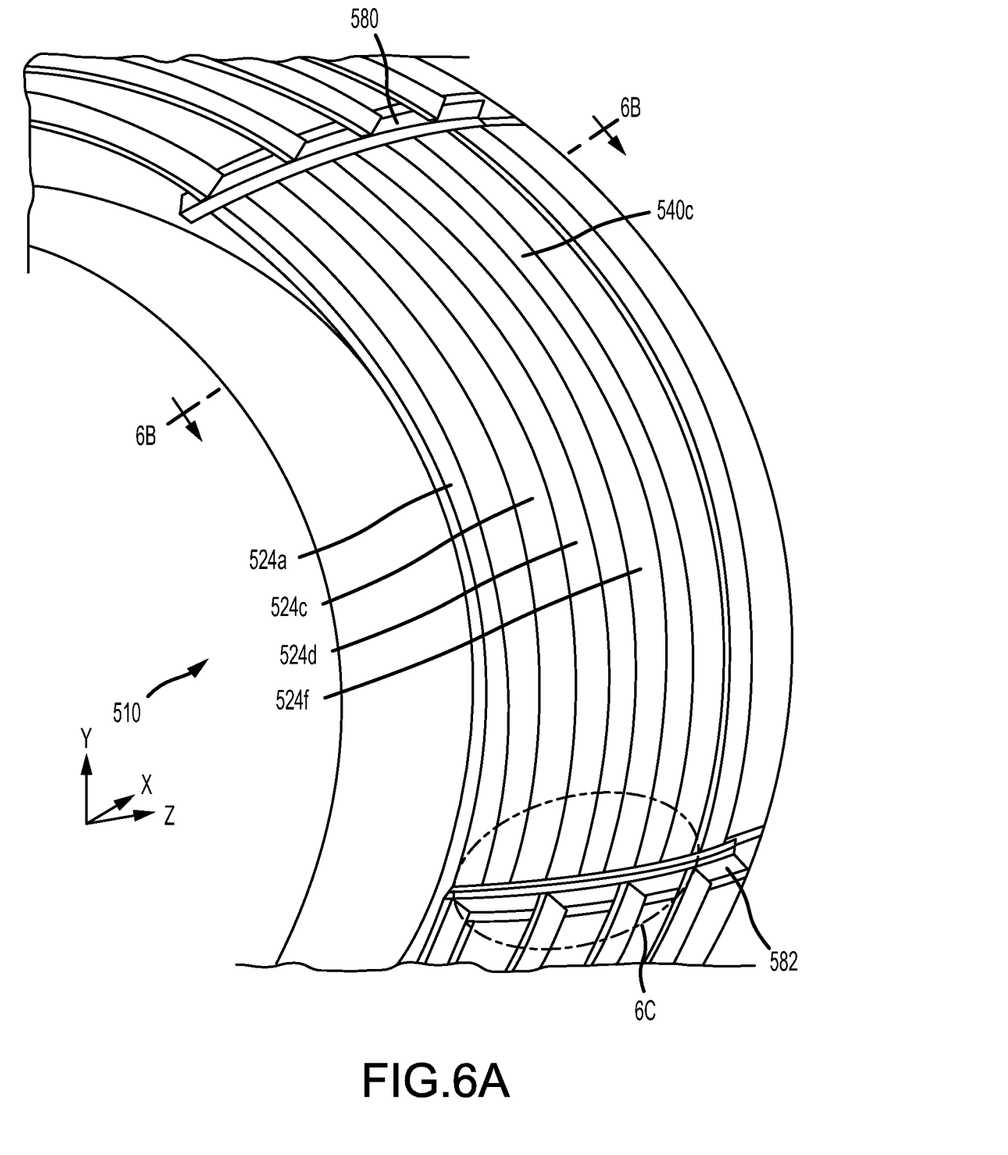
FIG. 6A, FIG. 6B, and FIG. 6C illustrate perspective views of the nacelle inlet of FIG. 5A having a first set of cover panels installed between hat stiffeners and the frames, in accordance with various embodiments.
Figure 6B:
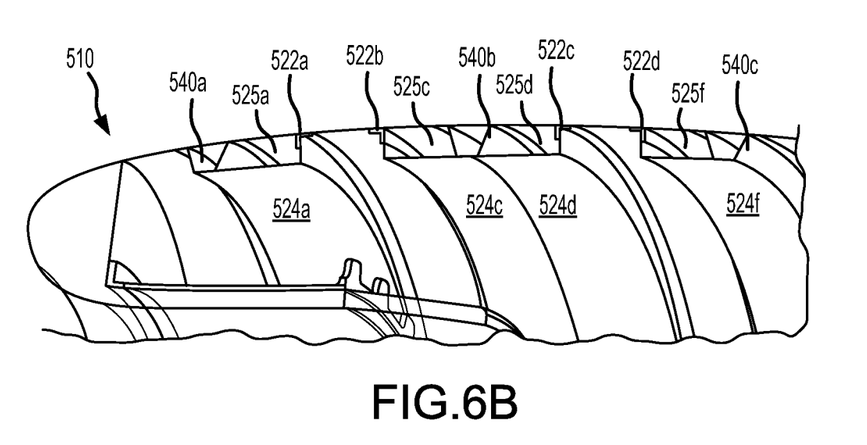
Figure 6C:
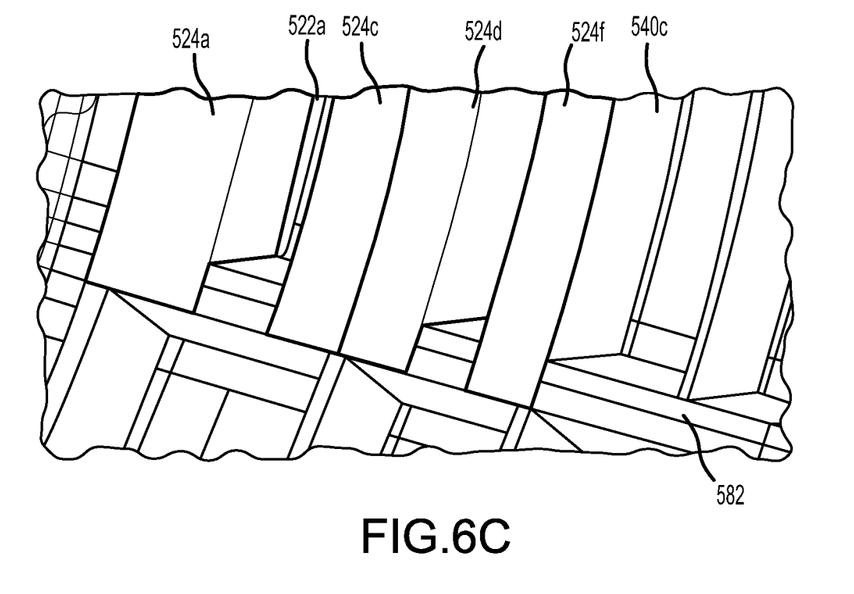

With combined reference to FIG. 6A, FIG. 6B, and FIG. 6C, nacelle inlet 510 with cover panel 524a, cover panel 524c, cover panel 524d, and cover panel 524f in the installed position is illustrated, in accordance with various embodiments. With momentary reference to FIG. 4, step 430 may include coupling cover panel 524a between hat stiffener 540a and frame 522a, thereby enclosing plenum 525a. Step 430 may include coupling cover panel 524a to stringer 580 and stringer 582. Step 440 may include coupling cover panel 524c between hat stiffener 540b and frame 522b, thereby enclosing plenum 525c. Step 440 may include coupling cover panel 524c to stringer 580 and stringer 582.

Figure 7A:
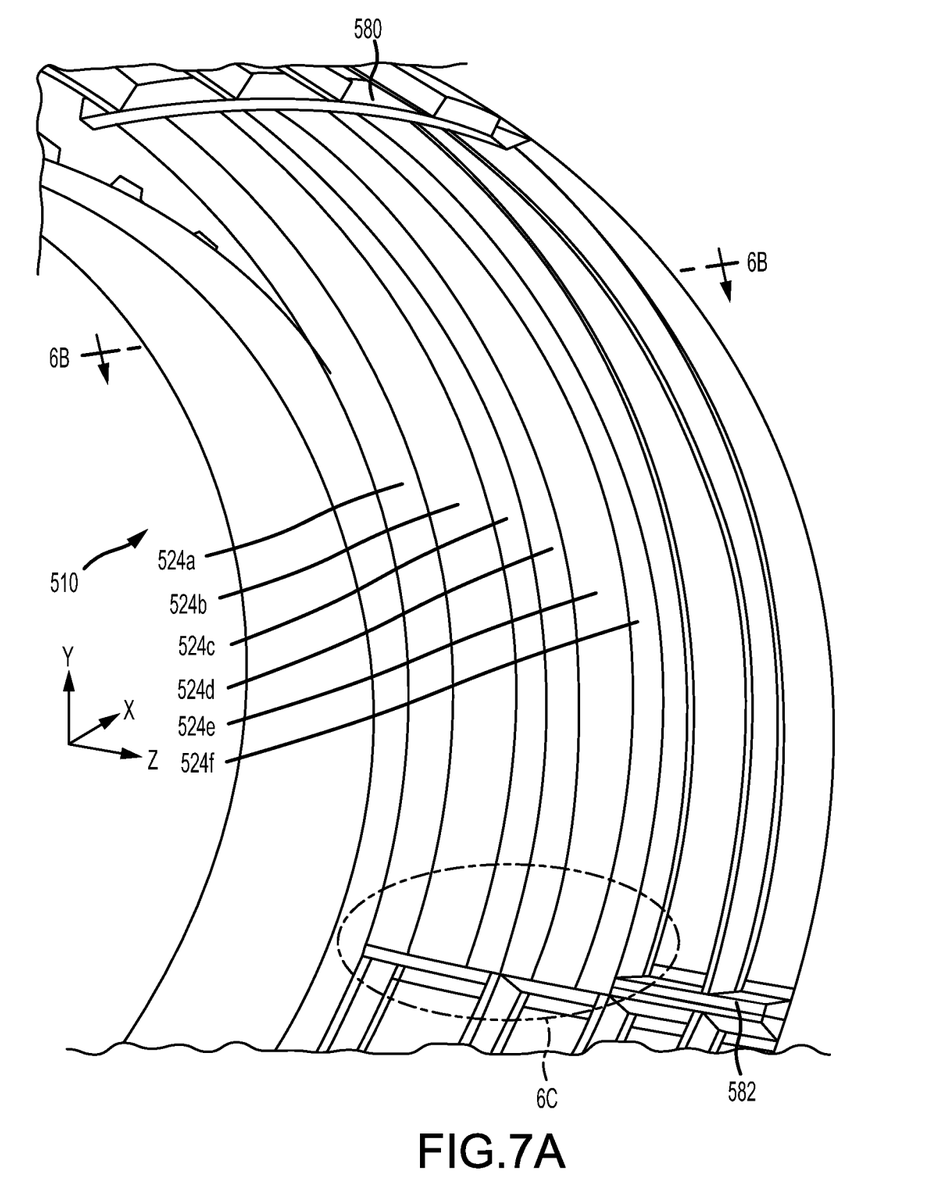
FIG. 7A, FIG. 7B, and FIG. 7C illustrate perspective views of the nacelle inlet of FIG. 6A having a second set of cover panels installed onto the first set of cover panels, in accordance with various embodiments.
Figure 7B:
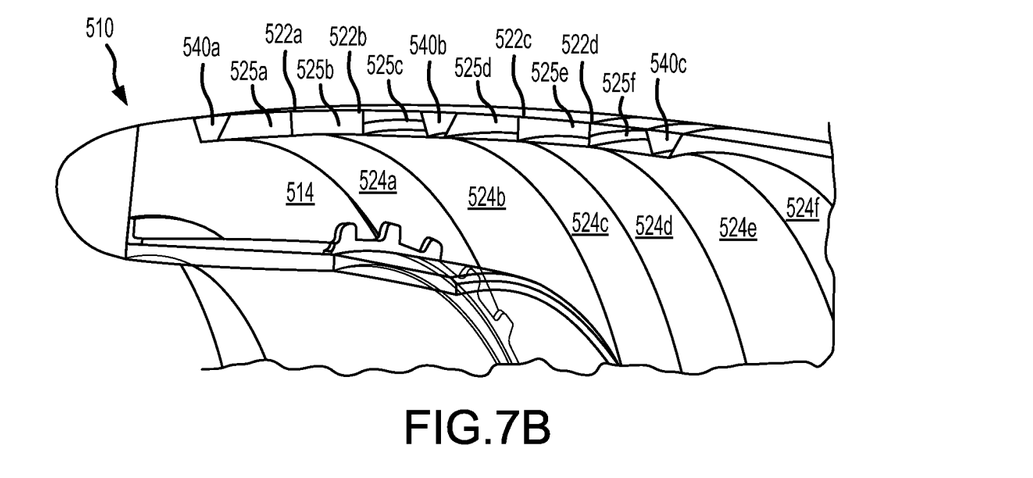
Figure 7C:
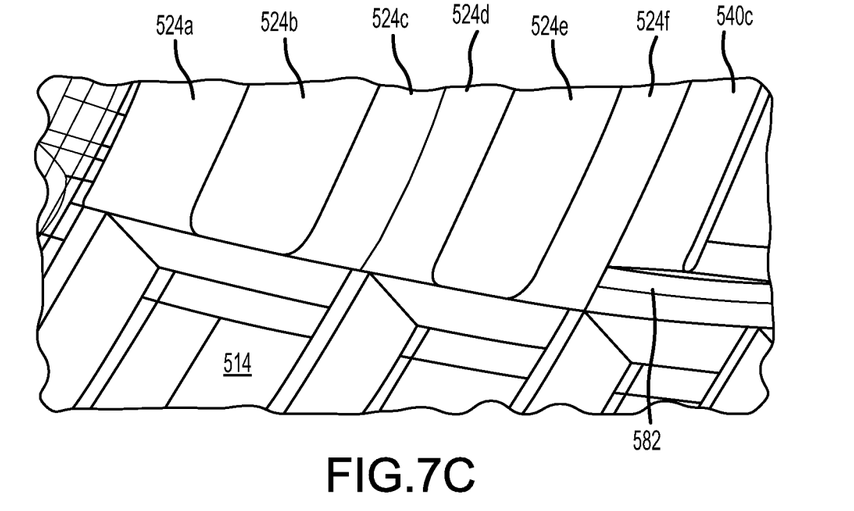

With combined reference to FIG. 7A, FIG. 7B, and FIG. 7C, nacelle inlet 510 with cover panel 524b and cover panel 524e in the installed position is illustrated, in accordance with various embodiments. With momentary reference to FIG. 4, step 450 may include coupling cover panel 524b between cover panel 524a and cover panel 524c, thereby enclosing plenum 525b. Step 450 may include coupling cover panel 524b to stringer 580 and stringer 582. Cover panel 524b may be placed in contact with cover panel 524a and cover panel 524c.

In various embodiments, cover panel 524a, cover panel 524b, cover panel 524c, cover panel 524d, cover panel 524e, and cover panel 524f may extend between stringer 580 and stringer 582 in the installed position. In this regard, plenum 525a may be defined circumferentially between stringer 580 and stringer 582, radially between inner surface 514 and cover panel 524a, and longitudinally between hat stiffener 540a and cover panel 524a and/or frame 522a. Plenum 525b may be defined circumferentially between stringer 580 and stringer 582, radially between inner surface 514 and cover panel 524b, and longitudinally between cover panel 524a and cover panel 524c. Plenum 525a and plenum 525b may be arcuate in shape. Cover panel 524a, cover panel 524b, and cover panel 524c may be coupled to stringer 580 and stringer 582 via a plurality of fasteners, e.g., fastener 342 (see FIG. 3B).

In various embodiments, cover panel 524a, cover panel 524b, cover panel 524c, cover panel 524d, cover panel 524e, and cover panel 524f may be made of a composite material such as carbon fiber, an aramid fiber, and/or glass fiber.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An active laminar flow control arrangement, comprising:
    an outer skin having a first hat stiffener and a second hat stiffener spaced apart along an inner surface of the outer skin and a first stringer and a second stringer spaced apart along the inner surface of the outer skin, the first stringer and the second stringer are oriented substantially orthogonal with respect to the first hat stiffener and the second hat stiffener;
    a first frame coupled to the inner surface and disposed between the first hat stiffener and the second hat stiffener,
    a second frame coupled to the inner surface and disposed between the first hat stiffener and the second hat stiffener, the first frame and the second frame oriented substantially parallel with respect to the first hat stiffener and the second hat stiffener;
    a first cover panel coupled between the first frame and the first hat stiffener;
    a second cover panel coupled between the second frame and the second hat stiffener;
    a third cover panel coupled between the first cover panel and the second cover panel;
    a first plenum at least partially defined circumferentially between the first stringer and the second stringer, radially between the inner surface and the first cover panel, and longitudinally between the first hat stiffener and the first cover panel and/or the first frame;
    a second plenum at least partially defined circumferentially between the first stringer and the second stringer, radially between the inner surface and the third cover panel, and longitudinally between the first cover panel and the second cover panel; and
    a third plenum at least partially defined circumferentially between the first stringer and the second stringer, radially between the inner surface and the second cover panel, and longitudinally between the second hat stiffener and the second cover panel and/or the second frame;
    wherein at least one of the first cover panel, the second cover panel, or the third cover panel extend from the first stringer to the second stringer.

2. The active laminar flow control arrangement of claim 1, further comprising a perforated area disposed in the outer skin.

3. The active laminar flow control arrangement of claim 1, wherein the first cover panel is coupled to the first frame via a first fastener.

4. The active laminar flow control arrangement of claim 3, wherein the first cover panel is coupled to the first hat stiffener via a second fastener.

5. The active laminar flow control arrangement of claim 4, wherein the third cover panel is coupled to the first cover panel via a third fastener.

6. The active laminar flow control arrangement of claim 5, wherein the first frame is coupled to the outer skin via a fourth fastener, the fourth fastener is flush with an outer surface of the outer skin.

7. The active laminar flow control arrangement of claim 2, further comprising a pump in fluid communication with the outer skin.

8. The active laminar flow control arrangement of claim 5, wherein at least one of the first cover panel and the second cover panel comprises a longitudinal wall and a radial wall extending from the longitudinal wall.

9. The active laminar flow control arrangement of claim 8, wherein the third cover panel overlaps the first cover panel and the second cover panel.

10. A nacelle inlet, comprising:
an outer skin having a first hat stiffener and a second hat stiffener spaced apart along an inner surface of the outer skin and a first stringer and a second stringer spaced apart along the inner surface of the outer skin, the first stringer and the second stringer are oriented substantially orthogonal with respect to the first hat stiffener and the second hat stiffener;
a first frame coupled to the inner surface and disposed between the first hat stiffener and the second hat stiffener,
a second frame coupled to the inner surface and disposed between the first hat stiffener and the second hat stiffener, the first frame and the second frame oriented substantially parallel with respect to the first hat stiffener and the second hat stiffener;
a first cover panel coupled between the first frame and the first hat stiffener;
a second cover panel coupled between the second frame and the second hat stiffener;
a third cover panel coupled between the first cover panel and the second cover panel;
a first plenum at least partially defined circumferentially between the first stringer and the second stringer, radially between the inner surface and the first cover panel, and longitudinally between the first hat stiffener and the first cover panel and/or the first frame;
a second plenum at least partially defined circumferentially between the first stringer and the second stringer, radially between the inner surface and the third cover panel, and longitudinally between the first cover panel and the second cover panel; and
a third plenum at least partially defined circumferentially between the first stringer and the second stringer, radially between the inner surface and the second cover panel, and longitudinally between the second hat stiffener and the second cover panel and/or the second frame;
wherein at least one of the first cover panel, the second cover panel, or the third cover panel extend from the first stringer to the second stringer.

11. The nacelle inlet of claim 10, further comprising:
a perforated area disposed in the outer skin;
wherein at least one of the first plenum, the second plenum, and the third plenum is configured to receive a flow of ambient air from an outer surface of the outer skin via the perforated area for maintaining a laminar flow of air over the outer skin.

12. The nacelle inlet of claim 11, further comprising a pump in fluid communication with the perforated area and configured to maintain the flow of ambient air.

13. The nacelle inlet of claim 10, wherein the first cover panel, the second cover panel, and the third cover panel are made from a carbon fiber composite material.

14. The nacelle inlet of claim 11, wherein the first plenum, the second plenum, and the third plenum are at least partially defined by the first stringer and the second stringer.

15. A method of installing a laminar flow control arrangement onto a nacelle inlet, comprising:
coupling a first frame to an inner surface of an outer skin of the nacelle inlet between a first stiffener and a second stiffener;
coupling a second frame to the inner surface between the first stiffener and the second stiffener;
coupling a first cover panel to a first stringer and a second stringer between the first stiffener and the first frame to enclose a first plenum, the first stringer and the second stringer circumferentially spaced apart and extending longitudinally along the inner surface of the outer skin, the first stringer and the second stringer oriented substantially orthogonal with respect to the first stiffener and the second stiffener, the first stiffener and the second stiffener extending between the first stringer and the second stringer;
coupling a second cover panel to the first stringer and the second stringer between the second stiffener and the second frame to enclose a second plenum; and
coupling a third cover panel to the first stringer and the second stringer between the first cover panel and the second cover panel to enclose a third plenum, the third plenum at least partially defined circumferentially between the first stringer and the second stringer, radially between the inner surface and the third cover panel, and longitudinally between the first cover panel and the second cover panel.

16. The method of claim 15, further comprising disposing the third cover panel radially inward from the first cover panel and the second cover panel, wherein the third cover panel overlaps the first cover panel and the second cover panel.

* * * * *